Patented Apr. 3, 1945

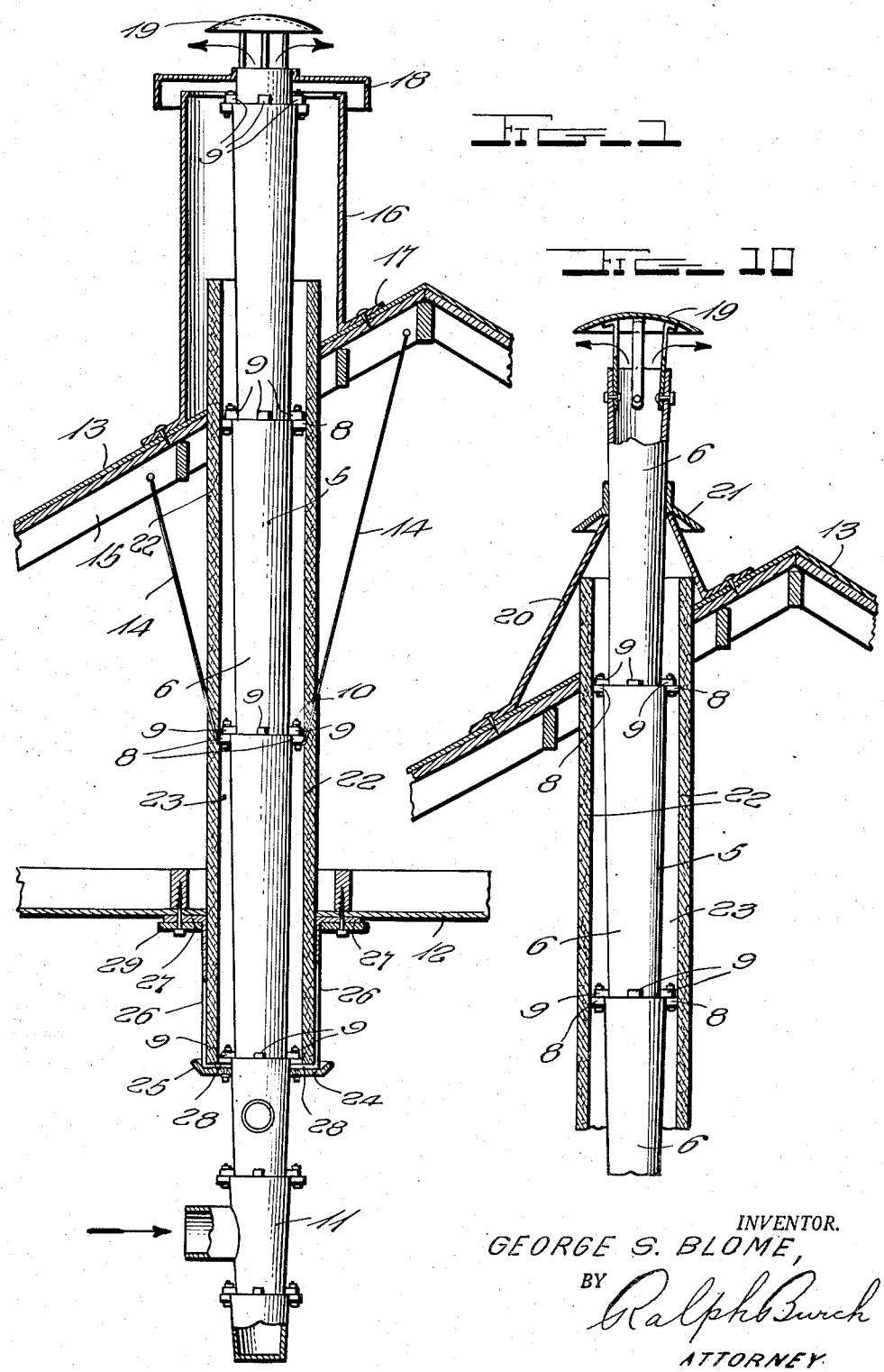

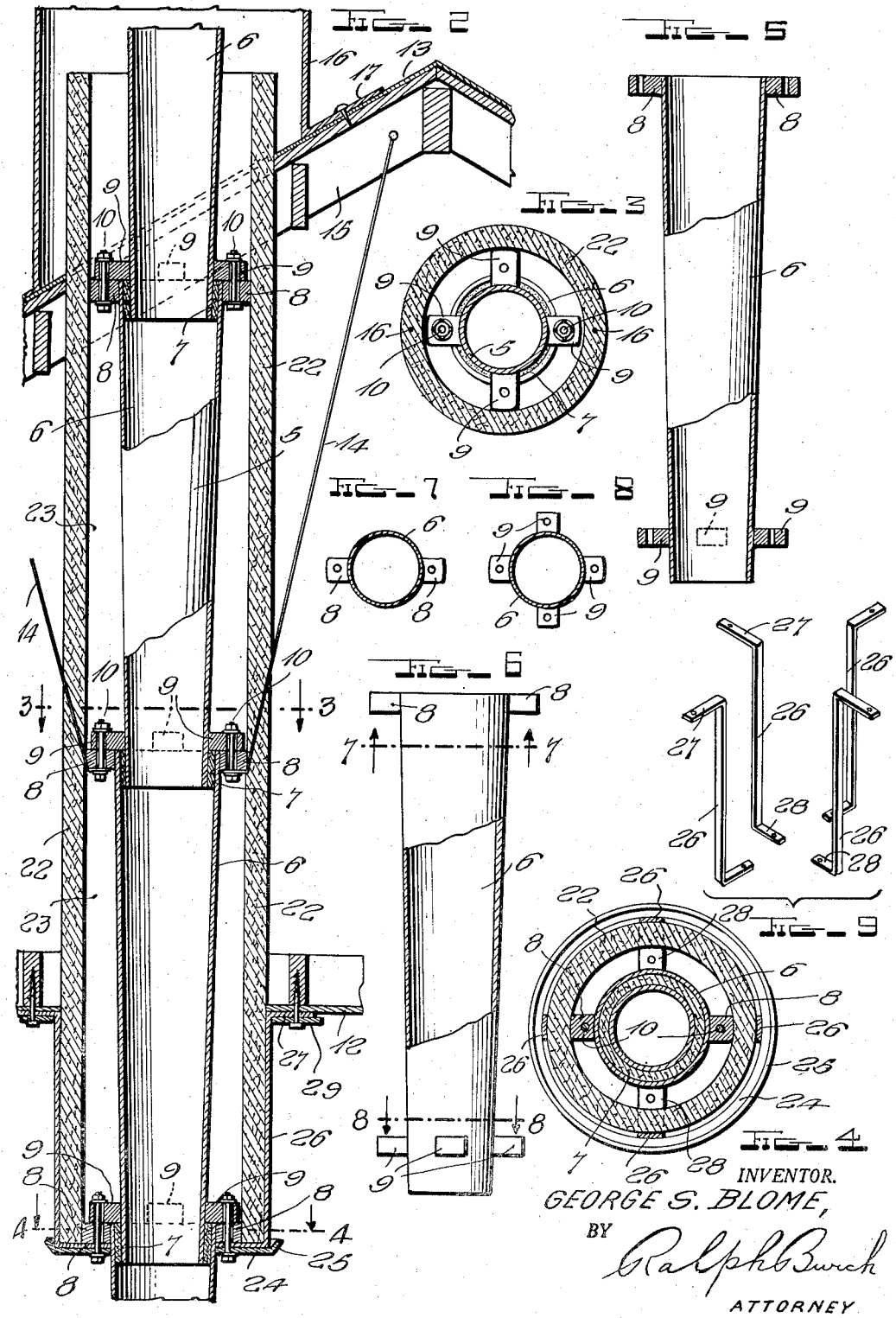

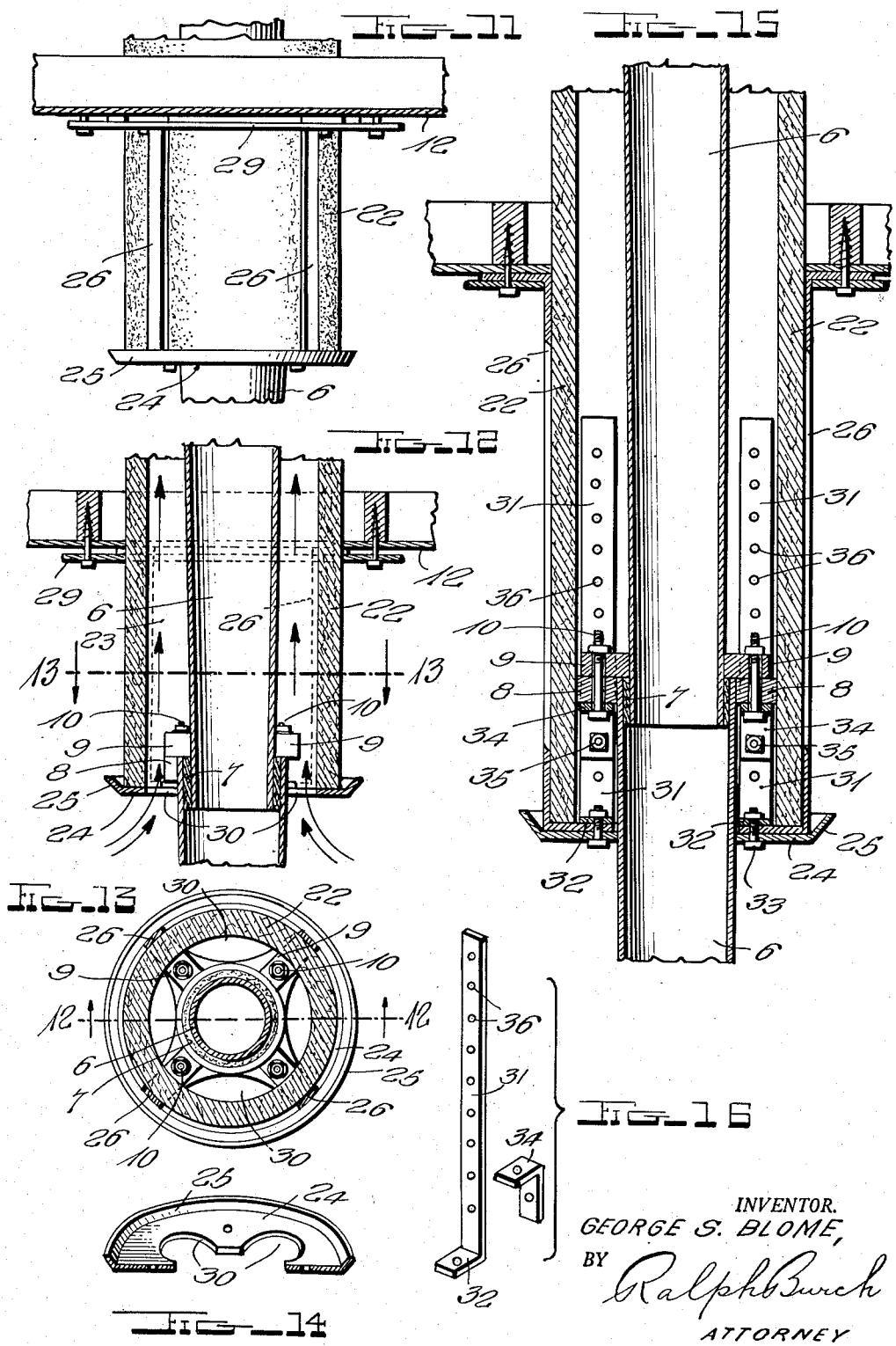

2,372,707

UNITED STATES PATENT OFFICE 2,372,707

SMOKE PIPE ASSEMBLY

George S. Blome, Baltimore, Md.

Application April 16, 1942, Serial No. 439,271

5 Claims. (Cl. 98—46)

This invention relates to a smoke pipe assembly and more particularly to an inexpensive and efficient smoke flue which may be substituted for the usual masonry chimney now employed in building structures.

It is an object of the invention to provide a smoke pipe composed of separable interchangeable pipe sections coated with porcelain enamel and having means for detachably securing the pipe sections in assembled relation to form a strong and durable structure.

A further object of the invention resides in mounting an insulation sleeve on the pipe assembly in spaced relation thereto to provide an air space between the sleeve and pipe for dissipating the heat and limiting the transmission of heat from the inside surface to the outside surface of the sleeve.

Another object of the invention resides in providing a device of the above-mentioned character which is simple and durable in construction, efficient and practical in use, and inexpensive to manufacture.

Other objects and advantages of the invention will be apparent during the course of the following description.

In the accompanying drawings forming a part of this specification and in which like numerals are employed to designate like parts throughout the same, Fig. 1 is a side elevational view of the pipe assembly, partly in section, showing the manner of mounting the same through the ceiling and roof of a building structure, Fig. 2 is an enlarged longitudinal sectional view showing more clearly the joints between the pipe sections, Fig. 3 is a cross section taken on line 3—3 of Fig. 2, Fig. 4 is a cross section taken on line 4—4 of Fig. 2, Fig. 5 is a side elevational view of one of the pipe sections with the ends in section, Fig. 6 is a side elevational view of one of the pipe sections with the center in section, Fig. 7 is a cross section taken on line 7—7 of Fig. 6, Fig. 8 is a cross section taken on line 8—8 of Fig. 6, Fig. 9 is a perspective view of the supporting straps for the insulation sleeve, Fig. 10 is a side elevational view of the pipe assembly showing a modified form of chimney cap, Fig. 11 is an enlarged side elevational view of the support for the insulation sleeve, Fig. 12 is a longitudinal sectional view of the lower end of the insulation sleeve and the support therefor, Fig. 13 is a cross section taken on line 13—13 of Fig. 12, Fig. 14 is a perspective sectional view of the support plate, Fig. 15 is a longitudinal sectional view of the lower end of the insulation sleeve showing a modified form of support, and Fig. 16 is a perspective view of the modified form of support strap and attaching angle bracket.

In the drawings, wherein for the purpose of illustration I have shown a preferred embodiment of my invention, the numeral 5 generally designates the smoke pipe which is composed of pipe section 6 formed of metal having their inner and outer surfaces coated with porcelain enamel to provide a smooth surface. The pipe sections are tapered throughout their length so that in assembling the pipe sections the small end of one pipe telescopically fits into the large end of another section, and, to establish an air-tight joint, an asbestos gasket 7 is disposed between the interfitting ends. The large end of each pipe section has two opposed apertured lugs 8 welded to the outside thereof, while the smaller end has four apertured lugs 9 welded to the outside, the lugs being arranged in opposed relation and being spaced inwardly from the end a sufficient distance to permit a reasonable lap joint between the interfitting sections. When the pipe sections are fitted together, the lugs 8 of one section abut against one of the pairs of lugs 9 of the next sections, and the apertures of the lugs 8 and 9 aline to receive bolts 10 for securing the sections firmly together. The fitting and securing of the pipe sections together is facilitated by providing two pairs of lugs 9, as it is necessary only to turn the interfitting pipe section a quarter of a turn in order to bring the lugs 8 and 9 into abutting relation. Any number of pipe sections may be employed depending on the length of the smoke pipe desired, and T sections of pipe 11 may be interposed in the pipe line where necessary.

When being erected in a building, the smoke pipe extends through alined openings in the ceiling 12 and roof 13, as shown in Fig. 1, the openings being relatively larger than the diameter of the pipe. The smoke pipe is suspended in an upright position by hanger rods 14 attached at one end to roof rafters 15 and at their opposite end to the bolts 10 of one of the pipe joints. The upper end of the smoke pipe projects above the top of the roof, and surrounding the exposed end of the pipe is a shell 16 which is spaced from the pipe and has its lower end cut at an angle to conform to the pitch of the roof. A flange 17 surrounds the lower end of the shell for attaching the same to the roof. A chimney cap 18 is mounted on the upper end of the smoke pipe in covering relation to the upper end of the shell, and a weather cap 19 is fitted in the end of the smoke pipe. The shell, chimney cap, and weather cap are coated with porcelain enamel which will retain an attractive appearance under all weather conditions. A modified form of chimney cap is shown in Fig. 10, which includes a conical roof flange 20 surrounding the smoke pipe which at its joint with the smoke pipe is covered by a flashing collar 21 secured on the smoke pipe.

In order to confine the heat dissipated from the smoke pipe, an insulation sleeve 22 is fitted over the smoke pipe, the sleeve being of such length that it extends below the ceiling and above the roof. The sleeve is of greater diameter than the smoke pipe and is held in spaced relation thereto by the lugs 8 and 9, thus providing an air space 23 between the pipe and sleeve. When the sleeve is installed, the walls may be slotted to allow for the passage of the hanger rods 14, and after the sleeve is installed the slots are closed by asbestos cement or other suitable sealing compound. The lower end of the insulation sleeve is supported by a circular plate 24 having an upturned marginal flange 25. The plate is supported by a plurality of hanger straps 26 suspended from the ceiling 12. The straps have angularly bent upper and lower ends 27 and 28, the upper ends 27 being secured to the ceiling by a ceiling plate 29 and the lower ends being secured to the plate 24 by the bolts 10 of one of the pipe joints. As more clearly shown in Figs. 13 and 14, the opening through the plate 24 is provided with a scalloped edge 30 to provide air passages which admit air into the air space 23 thereby causing a flow of air therethrough which rapidly dissipates the heat from the smoke pipe and increases the efficiency of the insulation. In some instances it is more desirable that a dead air space be provided between the insulation sleeve and the smoke pipe, and in such instances the opening through the plate 24 is formed with a circular edge to establish a close fit with the smoke pipe and thus close the lower end of the air space to exclude air therefrom. The upper end of the air space may be closed either by contracting the upper end of the insulation sleeve or by stuffing insulation material in the space between the insulation sleeve and smoke pipe. Thus, it is seen the air space 23 may be closed at both ends, or closed at the lower end only, or left open at both ends to permit a circulation of air to pass therethrough.

Under certain conditions it is necessary to extend the insulation sleeve 22 a considerable distance below the ceiling, and when this is necessary I have found it is desirable to employ an alternative supporting means for the plate 24, which is clearly disclosed in Figs. 15 and 16. The alternative supporting means includes hanger straps 31 having angularly bent ends 32 adapted to be secured to the inner marginal edge of the plate 24 by bolts 33. The straps extend upwardly in the space 23 between the sleeve 22 and pipe 5 and are connected to the bolts of the pipe joint by angular brackets 34 which in turn are adjustably connected to the straps by bolts 35 which engage one of the series of spaced openings 36 formed in the straps.

In use, the interchangeable pipe sections forming the smoke pipe permit a pipe of any desired length to be readily assembled and erected in a building structure. The detachable means for securing the pipe sections together insure a rigid construction, and yet enable the smoke pipe to be readily disassembled when desired. By coating the pipe sections with porcelain enamel on their inner and outer surfaces, a smooth surface free of obstructions is provided, insuring a free and uninterrupted passage of smoke through the pipe. As the porcelain enamel surface is acid-resistant and non-porous it will resist the adherence of soot to the walls of the pipe, thus making it unnecessary to clean the pipe and insuring long years of practical service. The insulation sleeve, which is fitted over the pipe in spaced relation thereto, effectively prevents the dissipation of heat beyond the insulation, thus eliminating all danger of fire should the smoke pipe become overheated. The space between the insulation sleeve and smoke pipe may be closed at both ends to provide a dead air space or if preferred the upper end of the space may be left open so that the heated air may pass out of the upper end which is disposed above the roof. Thus, it is seen I have provided a highly efficient smoke pipe which may be easily assembled and inexpensively installed in building structures.

It is to be understood that the forms of my invention herein shown and described are to be taken as preferred examples of the same and that certain changes in the shape, size, and arrangement of the parts may be made without departing from the spirit of the invention or the scope of the subjoined claims.

Having thus described my invention, I claim:

1. A smoke pipe assembly comprising interchangeable pipe sections, lugs on the outside of said pipe sections detachably securing the adjoining ends together, an insulation sleeve covering said pipe and held in spaced relation thereto by said lugs, a supporting plate for the lower end of said sleeve surrounding said pipe, and hanger straps having one end attached to said plate and their opposite ends extending into the space between said sleeve and pipe and attached to said lugs.

2. A smoke pipe assembly comprising interchangeable pipe sections, lugs on the outside of said pipe sections detachably securing the adjoining ends together, an insulation sleeve covering said pipe and held in spaced relation thereto by said lugs, a supporting plate for the lower end of said sleeve, and hanger straps having one end attached to said plate and their opposite ends adjustably secured to the lugs of one of the pipe joints.

3. A smoke pipe assembly comprising interchangeable pipe sections, lugs on the outside of said pipe sections for securing the adjoining ends together, suspension means for said pipe sections an insulation sleeve surrounding said pipe in spaced relation thereto, a plate surrounding said pipe for supporting the lower end of said sleeve, and means connecting said plate to the lugs of one of the pipe joints.

4. A smoke pipe assembly comprising interchangeable pipe sections detachably connected together, suspension means for said pipe sections, an insulation sleeve surrounding said pipe in spaced relation thereto, a plate surrounding said pipe for supporting the lower end of said sleeve and hanger straps connecting said plate to said pipe.

5. A smoke pipe assembly comprising interchangeable pipe sections detachably connected together, suspension means for said pipe sections, an insulation sleeve surrounding said pipe in spaced relation thereto, a plate surrounding said pipe for supporting the lower end of said sleeve and hanger straps adjustably connecting said plate to said pipe.

GEORGE S. BLOME.